United States Patent [19]

Duley

[11] 4,262,292

[45] Apr. 14, 1981

[54] MULTIPLEXED SCAN DISPLAY CIRCUIT

[75] Inventor: Raymond S. Duley, Spring Valley, Ohio

[73] Assignee: NCR Corporation, Dayton, Ohio

[21] Appl. No.: 95,766

[22] Filed: Nov. 19, 1979

[51] Int. Cl.[3] .......... G06F 3/14

[52] U.S. Cl. .......... 340/756; 340/762; 340/799

[58] Field of Search .......... 340/756, 762, 799, 750

[56] References Cited

U.S. PATENT DOCUMENTS

| | | | |
|---|---|---|---|
| 3,747,073 | 7/1973 | Sharpless | 340/756 X |
| 3,787,833 | 1/1974 | Rogers | 340/750 X |
| 3,821,731 | 6/1974 | Levine | 340/799 X |
| 3,866,171 | 2/1975 | Loshbough . | |
| 3,911,424 | 10/1975 | Giannuzzi et al. | 340/756 X |
| 3,937,999 | 2/1976 | Schott . | |
| 3,955,189 | 5/1976 | Thomson | 340/799 X |
| 3,962,701 | 6/1976 | Heimbigner . | |
| 3,999,180 | 12/1976 | Hickman . | |
| 4,044,280 | 8/1977 | Shulski . | |
| 4,125,993 | 11/1978 | Emile . | |

*Primary Examiner*—David L. Trafton
*Attorney, Agent, or Firm*—J. T. Cavender; Albert L. Sessler, Jr.; Elmer Wargo

[57] ABSTRACT

A circuit for controlling the updating of a display in which selected characters are displayed at selected positions therein. The circuit includes a memory unit having a plurality of addresses thereto and a processor for writing character data in the memory unit at the addresses, with the addresses corresponding to predetermined positions in the display. The memory unit also has a plurality of outputs which are operatively coupled to the display to enable the display to generate characters corresponding to the associated character data at selected positions in the display when the addresses are selected. The circuit also includes a counter unit which is specially wired for selecting the addresses for the characters to be displayed, and also for selecting the positions at which the characters are displayed. A control circuit enables either the processor or the counter unit to address the memory unit.

9 Claims, 17 Drawing Figures

COUNTER
CLK
+5V
96
86
38
62
64
68
180
151
150
152
153
167
126
128
136
132
130
138
134
166
156
158
160
162
164

FIG. 10
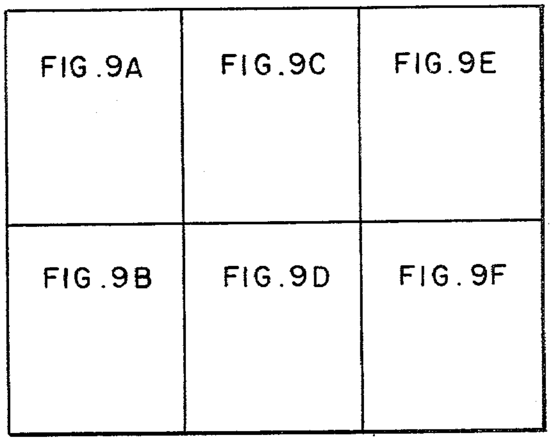
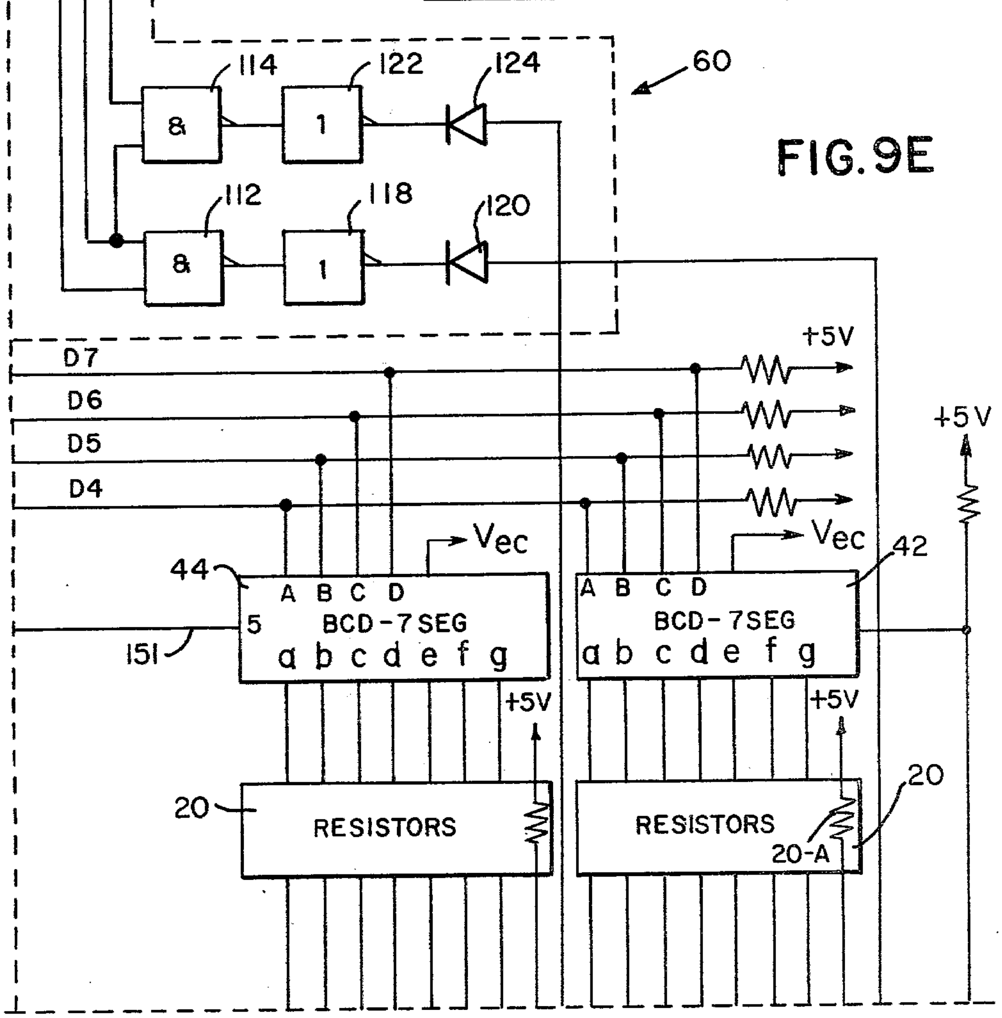
FIG. 9E

MULTIPLEXED SCAN DISPLAY CIRCUIT

BACKGROUND OF THE INVENTION

This invention relates to a circuit for multiplexing or updating a display such as a light emitting diode (LED) display.

Generally, integrated circuit electonic display modules require a coded counting sequence to drive particular segments comprising a character to be displayed. Often, complicated decoding logic is required to derive the signals for energizing the appropriate or selected segments for producing the desired character within a particular position within the display. In other LED displays of the stick type, large grounding currents are involved when certain duty cycles are utilized; often, the larger currents involved prevent the use of low cost integrated circuits or low-level operating voltages.

SUMMARY OF THE INVENTION

This invention relates to a circuit for controlling the updating of a display in which selected characters are displayed at selected positions therein. In a preferred embodiment of this invention, the circuit includes a memory unit having a plurality of addresses thereto and means for writing character data in the memory unit at the addresses, with the addresses corresponding to predetermined positions in the display. The memory unit also has a plurality of outputs which are operatively coupled to the display to enable the display to generate characters corresponding to the associated character data at selected positions in the display when the addresses are selected. The circuit also includes a counter means for selecting the addresses for the characters to be displayed, and also for selecting the positions at which the characters are displayed. Control means enable either the writing means or the counter means to address the memory unit.

Some of the advantages of this invention are:

(1) Standard, low-cost, transistor to transistor logic (TTL) integrated circuits may be used.

(2) A single +5 volt potential (for example) may be used.

(3) Low cost LED stick displays may be used instead of the more expensive discrete seven segment displays.

(4) Standard random access memories (RAM) may be used.

(5) Low cost, LED ground current drivers may be used instead of more costly, high-current, driver circuits.

(6) The circuit is transparent to a processor which is used for writing data into the memory unit.

These advantages and others will be more readily understood in connection with the following specification, claims and drawing.

BRIEF DESCRIPTION OF THE DRAWINGS

FIGS. 9A through 9F show more details of the scan circuit shown in FIGS. 1A and 1B;

FIG. 10 is a diagram showing how the FIGS. 9A–9F are arranged to form a composite drawing of the scan circuit shown therein.

DETAILED DESCRIPTION OF THE INVENTION

Figure 1A:
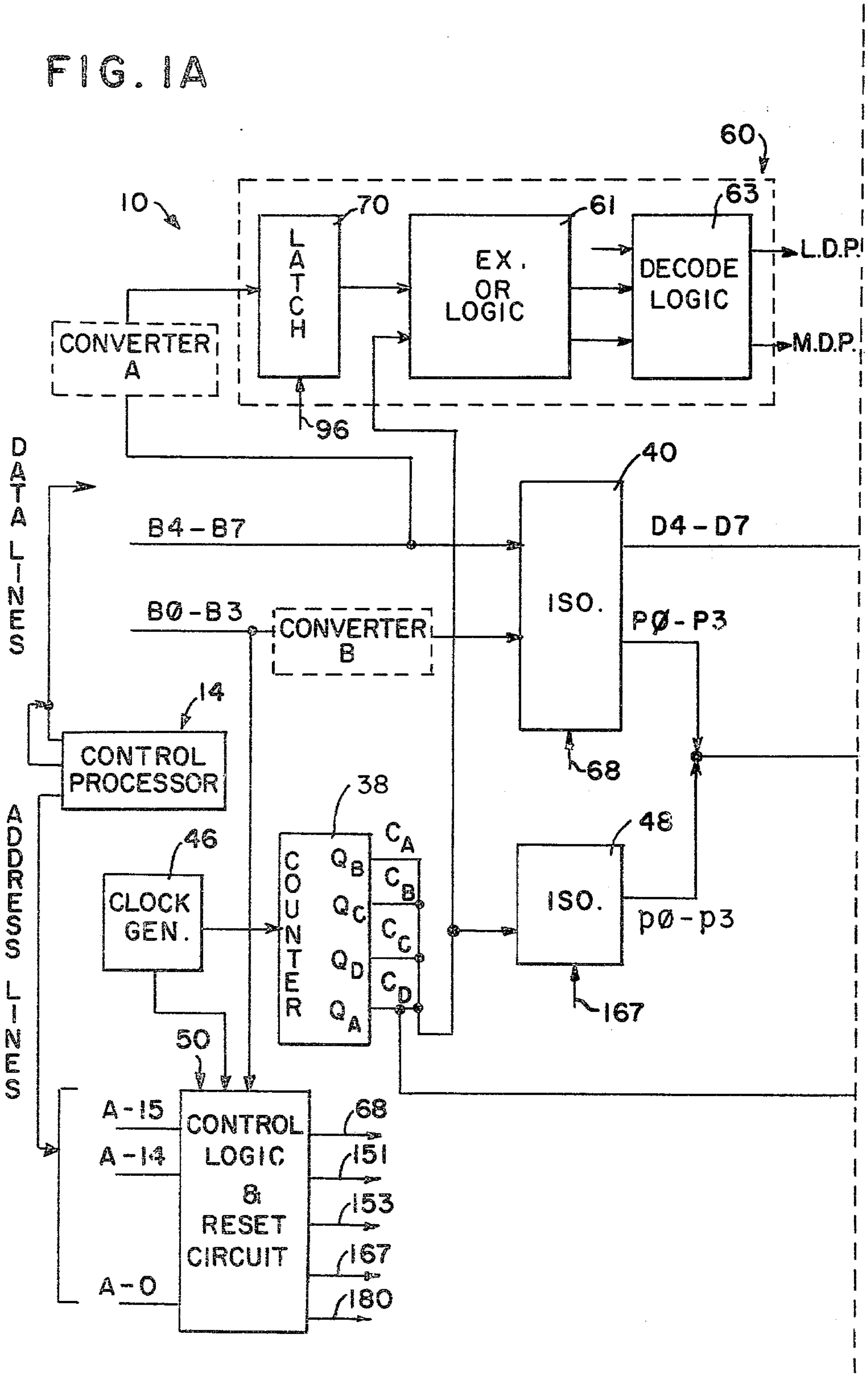
FIGS. 1A and 1B taken together comprise a general block diagram showing a preferred embodiment of the multiplexed scan display circuit of this invention.
Figure 1B:
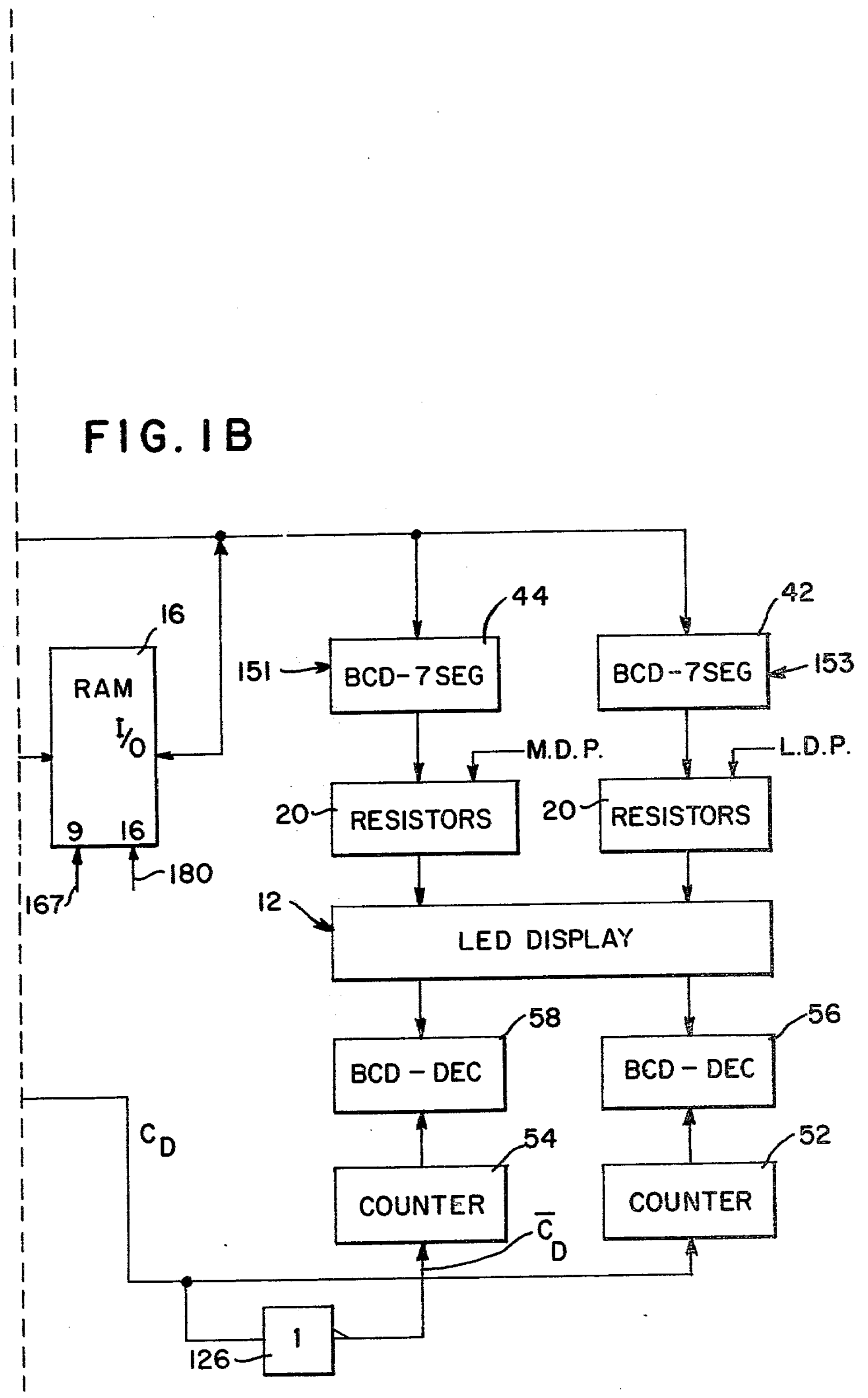

FIGS. 1A and 1B taken together comprise a general block diagram, showing a preferred embodiment of the multiplex, scan circuit of this invention which is designated generally as 10. The circuit 10 is designed to drive a light emitting diode (LED) display 12, which, for example in the embodiment being described, contains 7 bar segments per character, with up to 16 character positions being available in the display 12; however, the number of segments per character and the number of character positions available may be changed to suit particular applications.

In general, a control processor 14 is used to address the circuit 10 and data is transferred to the LED display 12 in 8 bit words in the embodiment described. The processor 14 writes up to 16 characters into a memory unit or a random access memory (RAM) 16 (FIG. 1B) included in the circuit 10. Thereafter, the processor 14 addresses the circuit 10 only when the information on the display 12 is to be changed, and at other times, refresh circuitry included in the circuit 10 is used to refresh or re-energize the individual characters in the display 12.

Before proceeding with a detailed discussion of the circuit 10, it appears convenient to discuss some of the details associated with the LED display 12, and how the human eye views the display 12.

Figure 2:
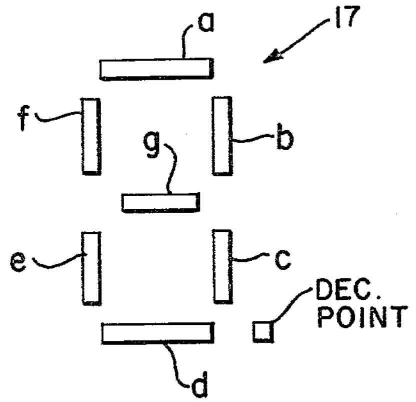
FIG. 2 is a diagram showing a seven-segment, bar-type layout which may be used for producing individual characters in the LED stick display shown in FIG. 1.
Figure 3:
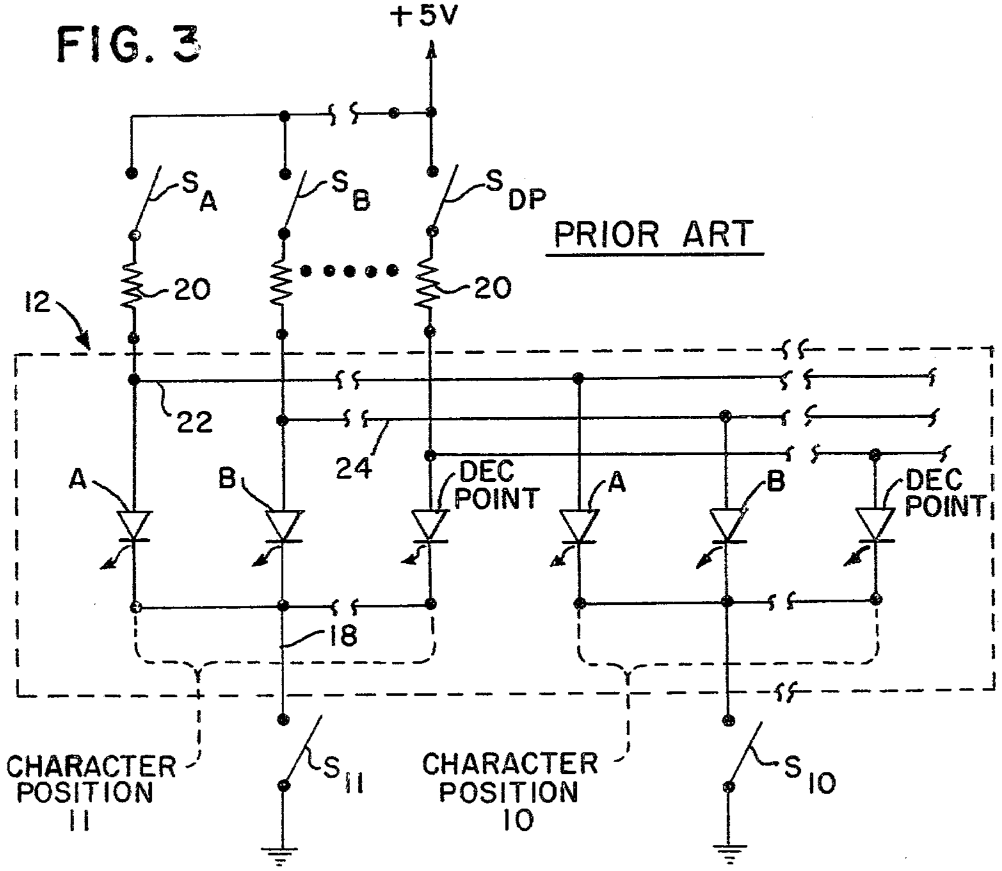
FIG. 3 is a detailed partial view of an LED stick type display.

FIG. 2 is a diagram showing a seven-segment, bar-type character layout 17 which may be used for producing individual characters in the display 12 shown in FIGS. 1 and 3. The layout 17 includes the bar segments lettered a, b, c, d, e, f, and g which are used to display both numbers and letters; however, in the circuit 10 being described, only numbers will be displayed.

FIG. 3 is a detailed, partial view of a conventional LED display device which is known as an LED "stick" display which may be used as display 12. The "stick" display 12 utilizes an anode switch for each bar segment such as switches $S_A$, $S_B$, . . . $S_{DP}$, with switches $S_A$ and $S_B$ corresponding to segments a and b in FIG. 2, and with one switch (not shown) being provided for each of the remaining segments like c, d, e, f, and g) shown in FIG. 2. The display 12 may be a conventional display, such as #TIL804 which is manufactured by Texas Instruments, Inc., for example. Switch $S_{DP}$ relates to the decimal point shown in FIG. 2, with one such decimal point being provided for each character position to be displayed. The diodes marked as A, B; etc., and Dec. Point (FIG. 3) are light emitting diodes and correspond to the segments a, b, etc., and the decimal point shown in FIG. 2; when energized, these diodes emit light as is conventionally done. The cathodes for the diodes for each character position, as for example character position 11, are connected to a common conductor 18, and a cathode switch $S_{11}$ is used to connect the selected diodes (A, B, etc.) to ground reference or to "ground" them. Current limiting resistors 20 are used to protect the diodes (like A, B) from exceeding their power ratings as is conventionally done.

If the numeral "2" is to be displayed in character position 11 in FIG. 3, for example, the switches $S_A$, $S_B$, $S_G$, $S_E$, and $S_D$ associated with segments a, b, g, e, and d, respectively, would be closed, and the cathode switch $S_{11}$ associated with character position 11 would also be closed to complete the energizing circuit between the +5 volts and ground to display the desired character. In the display 12 (FIG. 3), all the anodes for the diodes A are connected together by a common conductor 22, all the anodes for the diodes B are connected together by a common conductor 24, etc. When the switch $S_A$ is closed, all the segments "a" for the different character positions are connected to the +5 volts; however, only that particular diode "A" for the character position whose cathode switch (like $S_{11}$ or $S_{10}$) is closed will be energized and emit light.

The individual diodes like A, B, etc., in FIG. 3 which are shaped as are the bar segments a, b, etc., shown in FIG. 2, do not remain "on" or remain energized all the time during which the associated characters are being displayed. With 12 character positions being displayed and being numbered from #0 through #11 in the embodiment described, the usual prior art method of energizing the display is to sequentially display, rapidly, the data for character positions #0 through #11, which data for these positions are sequentially redisplayed as long as the displaying is desired. Only one character position is energized or displayed at any one time; however, the sequential energization is so fast that the human eye cannot detect the intermittent energizations of the diodes at the various character positions. In general, character position #0 is displayed first, followed by the sequential energizations of the diodes associated with character positions #1 through #11. The anode switches $S_A$, $S_B$ etc. are necessary for selecting the particular pattern for a character to be displayed, and the cathode switches like $S_0$ through $S_{11}$ are necessary for selecting the particular character position at which the pattern determined by the closing of anode switches is to be displayed. The switches like $S_A$, $S_B$, and $S_{DP}$ are shown as mechanical switches for ease of illustration; however, in the circuit 10, these switches are transistor or solid state switches (to be later described herein) to effect the rapid switching required.

Earlier herein it was stated that at certain duty cycles, large, expensive current grounders are necessary. For example, if the number "8" is to be displayed, it is apparent that all seven segments lettered a through g in FIG. 2 would have to be energized. With a pulsed LED current being approximately 20 ma for each segment energized, the total grounder current would be 7 times 20 ma/segment or 140 ma; this is the amount of current which would be passing through switch $S_{11}$ in FIG. 3 if the number "8" were to be displayed in character position 11. This amount of current exceeds the standard sink currents for transistor to transistor logic (TTL), integrated circuit (IC) technology for a low cost circuit or grounder such as IC #74145 (which is manufactured by Texas Instruments, Inc., for example); consequently, a more costly, high current grounder such as IC #ULN2003A (which is manufactured by Signetics) must be used. The use of the high current grounders (which typically are of the Darlington transistor configuration) mentioned causes a secondary problem in that the collector to emitter saturation voltage associated with such high current grounders readily exceeds one volt, and if a +5 volt source of potential were to be used in the display 12 (FIG. 3), there would not be enough voltage potential available for current sourcing an IC used as the anode switches like $S_A$, for the current limiting resistors (like 20), and for the potential drop across the LEDs like diodes A, which drop is typically greater than 1.8 volts; thus the use of a source of potential greater than 5 volts would be required, thereby increasing the cost of the circuit 10.

One of the advantages of the invention, as mentioned earlier herein, was that it avoided the use of high-current, expensive grounders; however, before discussing how this is accomplished, it appears appropriate to discuss certain aspects of LED displays as they relate to the human eye.

Figure 4:
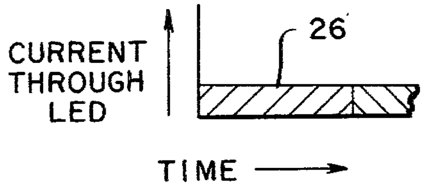
FIGS. 4, 5, and 6 are graphs depicting various energizing currents vs. time relationships for LEDs.
Figure 5:
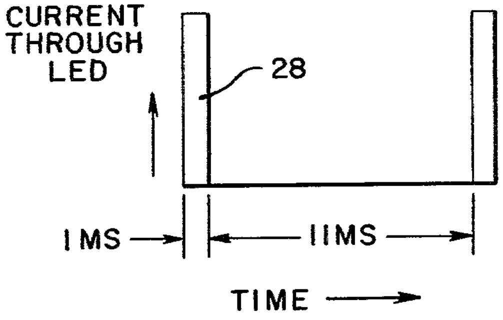
Figure 6:
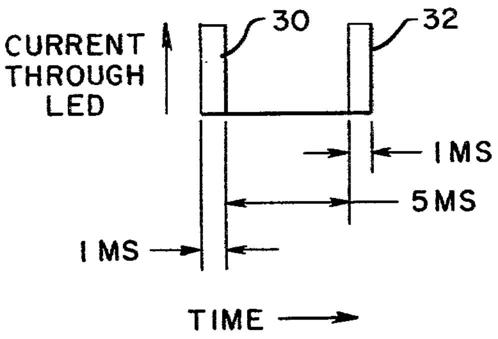

Although LED displays are intermittently energized, they give the appearance of being continuously "on" to the human eye. As a general rule of thumb, a small current passing through an LED for a certain period of time, as represented by the block 26 in FIG. 4, for example, has the same effect upon the human eye as a much stronger current passing through an LED for a shorter period of time as represented by the block 28 in FIG. 5, provided of course that the periods of time mentioned are within the normal operating parameters of the human eye. In other words, if the area of block 26 in FIG. 4 equals the area of block 28 in FIG. 5 for an operating period, then the human eye perceives no difference between the two situations, the area of the blocks 26 and 28 being a "current" times "time" factor. In FIG. 5, the energizing pulse represented by block 28 stays "on" for one millisecond and is "off" for 11 milliseconds, making a duty cycle time of one-twelfth. In FIG. 6 the current through the LED as represented by blocks 30 and 32 is one half the amount represented by block 28; however, the duty cycle for the scheme shown in FIG. 6 is comprised of an "on" period of 1 millisecond and an "off" period of 5 milliseconds making the duty cycle one-sixth. The smaller amount of current applied at a more frequent rate (FIG. 6) produces the same effect upon the human eye as the larger amount of current applied less frequently (FIG. 5). This feature is used in the present invention.

Figure 7:
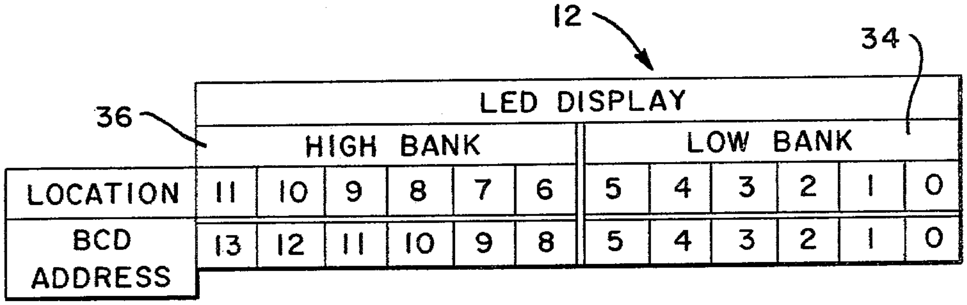
FIG. 7 is a diagram showing the organization of the LED display shown in FIG. 1.

In order to implement the idea of energizing the LED's with a small current at a rapid rate compared to energizing with a larger current applied less frequently, the LED display 12 was divided into a low bank 34 and a high bank 36 as shown in FIG. 7. In the embodiment being described, there are 12 character positions or locations ranging from positions or locations 0 through 11. The low bank 34 contains the character positions or locations 0 through 5 and the high bank 36 contains the character locations 6 through 11. The character location "0" represents the least significant digit (LSD), and the character location "11" represents the most significant digit (MSD).

A usual, prior-art method of energizing the characters of an LED display is to sequentially energize the characters at locations 0 through 11 and repeat that sequential energization. In the present invention, the order of energizing or "multiplexing" the characters at locations 0 through 11 is: 0, 6, 1, 7, 2, 8, 3, 9, 4, 10, 5, 11, and 0 etc. In other words, the method of multiplexing is to energize the LSD of the low bank 34 (i.e. "0"), then the LSD of the high bank 36 (i.e. "6"), then the next LSD of the low bank 34 (i.e. "1"), and then the next LSD of the high bank 36 (i.e. "7"), etc. While the multiplexing order has been described with regard to 12 positions, the order may be considered generically to cover a greater number or a fewer number of positions. For example, the positions of the low bank 34 may be considered consecutively from the LSD to the MSD as a, b, c, . . . n, and similarly, the positions of the high bank 36 may be considered consecutively from the LSD as $a_1$, $b_1$, $c_1$ . . . $n_1$; accordingly, the multiplexing order can be stated as a-$a_1$, b-$b_1$, c-$c_1$ . . . n-$n_1$. This method of multiplexing permits the use of a smaller energizing current (analogous to FIG. 6) compared to the usual prior art method (analogous to FIG. 5).

The order of "multiplexing" the various character locations of the LED display 12 is derived from a special wiring of a conventional binary coded decimal (BCD) counter. For example, in the embodiment being described, a counter such as IC #7493 which is manufactured by Texas Instruments, Inc. may be used.

Figure 8:
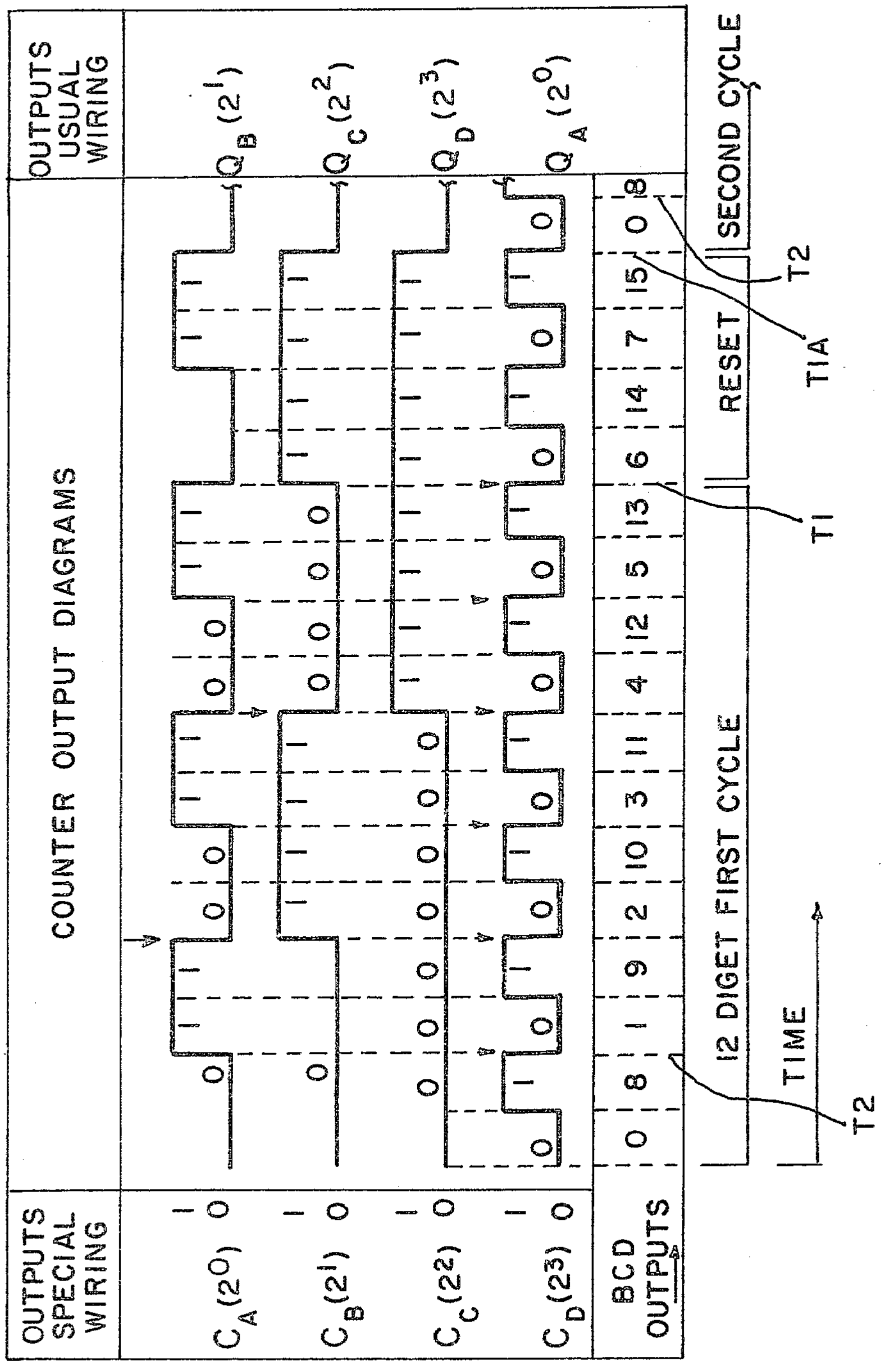
FIG. 8 shows various diagrams associated with the output terminals of a counter.

FIG. 8 shows a series of diagrams associated with a conventional BCD counter of the type mentioned in the previous paragraph. When the counter is used normally, the terminals or outputs of the counter, namely $Q_A$, $Q_B$, $Q_C$, and $Q_D$ and their associated powers $2^0$, $2^1$, $2^2$, and $2^3$, respectively, are shown under the column marked "Outputs, Usual Wiring", and are located next to their associated timing diagrams. Under the present invention, for example, the output which is normally the $Q_A$ or ($2^0$) output is considered the $C_D$ or ($2^3$) output as shown in FIG. 8 under the column marked "Outputs Special Wiring". The output which is normally $Q_B$ or ($2^1$) becomes the $C_A$ or ($2^0$) output, with the remaining outputs $C_B$ and $C_C$ and their associated timing diagrams shown in FIG. 8. When a counter such as counter 38 (FIG. 1A) has its outputs wired or utilized according to FIG. 8, the BCD output shown in FIG. 8 becomes 0, 8, 1, 9, 2, 10, 3, 11, 4, 12, 5, and 13, with these first 12 outputs from the counter representing a first cycle of 12 digits. The next outputs from the counter namely 6, 14, 7, and 15 in FIG. 8 are marked RESET; this aspect will be covered later herein. After the output 15, a second cycle, beginning with the number "0" is repeated. The BCD outputs shown in FIG. 8, i.e., 0, 8, 1, 9, etc. are utilized to provide the addresses to the LED display 12 (FIG. 3) for the multiplexing order or sequence for energizing the display 12 as mentioned earlier herein. The correlation between the BCD outputs (FIG. 8) and the addresses for the various digit locations for the low bank 34 and the high bank 36 are shown in FIG. 7. From the sequence of the BCD outputs in FIG. 8, i.e. 0, 8, 1, 9 etc., it follows that the LSD "0" in the low bank 34 (FIG. 7) will be addressed first to be energized, then the BCD address 8 will cause the location "6" of the high bank 36 to be energized, etc., as previously explained.

Having discussed some of the details associated with the LED display 12, and also having discussed how the human eye views the display 12, and how the addresses are developed for energizing the selected diodes at the various locations within the display 12, it appears as though the general explanation of the circuit 10 can be conveniently resumed.

With regard to FIGS. 1A and 1B, the data for a character to be displayed enters the circuit 10 via the four data lines B4–B7, and the position of the character to be displayed similarly enters via the four position lines Bϕ–B3. The Bϕ–B3 lines comprise the four least significant bits, and the B4–B7 lines comprise the four most significant bits of the 8 bit data words mentioned earlier herein. The Bϕ–B7 lines are fed into an isolator circuit 40.

The output lines D4–D7 (for character data from data line B4–B7) from the isolator circuit 40 are fed into the input/output (I/O) ports of the RAM 16, and are also fed into a pair of identical BCD to 7 segment converters 42 and 44. The RAM 16 may be a conventional RAM such as #2111 which is manufactured by Intel Corporation. The converters 42 and 44 perform the switching function related to anode switches $S_A$, $S_B$, etc. shown in FIG. 3. Converter 42 handles the switching function for the low bank 34 (FIG. 7) and converter 44 handles the switching function for the high bank 36. The P100 -P3 lines leaving the isolator circuit 40 correspond to the position data from lines Bϕ–B3, and these Pϕ–P3 lines supply the appropriate addresses to the RAM 16 to be utilized in positioning the character data at the appropriate character position in the LED display 12. With the appropriate character data and position data located in the RAM 16, the control processor 14 does not need to address the scan circuit 10 until data to be displayed is to be changed, i.e., the refreshing of data in the LED display 12 is transparent to the control processor 14.

In order to refresh the data in the LED display 12, the circuit 10 (FIGS. 1A and 1B) includes among other elements, a clock generator 46, and the counter 38 already previously discussed herein. The generator 46 produces a square wave (at a frequency of 1 K Hz. in the embodiment being described) which is used to increment the counter 38 as previously described. In general, a frequency lower than 1 K Hz. may cause the human eye to recognize that the LED display 12 is being "multiplexed", and multiplexing frequencies approaching 60 Hz. are certainly troublesome to the human eye. The output of the counter 38 is fed to an isolator circuit 48 over the bus lines $C_A$, $C_B$, $C_C$, and $C_D$. The output of the isolator circuit 48 is comprised of bus lines pϕ, p1, p2, and p3 which correspond to the $C_A$, $C_B$, $C_C$, and $C_D$ outputs, respectively, of the counter 38 and are analogous to the bus lines Pϕ–P3. The isolator circuit 40 and the isolator circuit 48 operate to provide the addresses to the RAM 16; however, when the addresses are provided via the isolator circuit 40, the isolator circuit 48 is disabled, and alternatively, when the addresses are provided by the counter 38 via the isolator circuit 48, the isolator circuit 40 is disabled.

The scan circuit 10 (FIGS. 1A and 1B) also includes a control logic and reset circuit hereinafter referred to as control circuit 50. When a high level control signal from conductor 167 of the control circuit 50 is applied to the isolator circuit 48, and the RAM 16, character data and position data from the control processor 14 are received on lines B4–B7 and Bϕ–B3, respectively, and are written into the RAM 16 as previously explained. At the same time, a low level control signal from conductor 68 of the control circuit 50 is applied to the isolator circuit 40, to enable the processor 14 to update the RAM 16. At this time, a high level signal (over conductor 167) drives the RAM 16 in a write mode, and at this time the counter 38 is precluded from providing the multiplexing order or the addresses for refreshing the data in the LED display 12 as previously described.

During the refresh mode, when the output of counter 38 is utilized (via an activated isolator 48 and a deactivated isolator 40), the scanning or multiplexing order, i.e., 0, 8, 1, 9 etc. is used to provide the addresses to the RAM 16 (FIG. 1B) to select the character to be displayed via the anode switches like $S_A$, $S_B$ (FIG. 3) associated with the converters 42 and 44. At the same time, the counters 52 and 54 are utilized to develop the counts necessary which are used to select the particular cathode switches like $S_{11}$, $S_{10}$ which locate the position at which the data is to be displayed. The outputs of the counter 52 are fed into a conventional binary coded decimal to decimal (BCD-DEC) converter 56 which performs the function of closing the appropriate cathode switch like switch $S_1$, $S_2$ (not shown) in the low bank 34 (FIG. 7) of the display 12 to select the character location to be energized. Similarly, the counter 54 and the BCD-DEC converter 58 are used to select a particular cathode switch like $S_{11}$, $S_{10}$ in the high bank 36 (FIG. 7) of the display 12. The current limiting resistors like 20 (FIG. 3) are shown as blocks 20 in FIG. 1B.

The scan circuit 10 (FIGS. 1A and 1B) also includes optional converters shown as converters A and B. The function of the converters A and B is to convert an incoming location number to the corresponding BCD address, as shown by the correlation already discussed in relation to FIG. 7. The converters A and B enable the circuit 10 to be utilized by a utilization device (not shown) which presents the data for displaying at the display 12 by the locations #0 through #11 as shown in FIG. 7.

The scan circuit 10 (FIGS. 1A and 1B) also includes a decimal point circuit 60 for positioning a decimal point in the display 12; this aspect will be described hereinafter.

FIGS. 9A–9F (taken together as shown in FIG. 10) show more details of the scan circuit shown in FIGS. 1A and 1B.

As previously stated, the Bϕ–B3 and the B4–B7 data lines are fed into the isolator 40 (FIG. 1A). The isolator 40 is comprised of sections 40-1 and 40-2 shown in FIG. 9C. The isolator section 40-1 receives the position data from lines Bϕ through B3, and the isolator section 40-2 receives the character data from the lines B4 through B7. The isolator sections 40-1 and 40-2 have tri-state outputs, and each section is an IC chip such as #DM 8097 which is manufactured by National Semiconductor, for example. These isolator sections 40-1 and 40-2 are active only during the times when the control processor 14 writes data into the RAM 16; during these times, the processor 14 is the sole driver of the address and I/O lines to the RAM 16. During a time when the processor 14 writes into the RAM 16, the output/disable line thereof (pin #9) is disabled (or at a high level) so that the data on the lines D4–D7 will be considered as an input to be written into the RAM 16, and will be stored at the address indicated on lines Pϕ–P3. When the data is stable on the lines D4–D7, the read/write line (pin #16) of the RAM 16 is strobed with a negative going pulse to write data therein. The output/disable line (pin #9) of the RAM 16 is placed in a high state during a write mode and is placed in a low state during a read mode. The control processor 14 writes data into the RAM 16 sequentially or asynchronously by just applying the proper address and data thereto and exercising the control lines (pins #9 and #16) of the RAM 16 as previously explained. An advantage of the circuit 10 is that the processor 14 writes into the RAM 16 via the two isolator sections 40-1 and 40-2, and all other circuitry in the scan circuit 10 is transparent to the control processor 14; therefore, to the processor, it looks as though it is simply refreshing one of twelve memory locations within the RAM 16 in the embodiment described.

The isolator sections 40-1 and 40-2 (FIG. 9C) have gates 62 and 64 (FIG. 9D), respectively, associated therewith. During the times that the control processor 14 writes into the RAM 16, the gates 62 and 64 prevent the counter 38 from exercising or providing the addresses to the RAM 16 as previously explained. Gate 62 is actually a part of section 40-1, and similarly, gate 64 is a part of section 40-2. The gates 62 and 64 are also used as buffers and isolators, have tri-state output lines (pins #11 and #13), and are controlled by the control inputs (pins #15) thereto. Counter 38 is always running or being incremented; therefore, the only times that the counter provides addresses to the RAM 16 are those times when the gates 62 and 64 are enabled. A high level signal to the pins #15 of gates 62 and 64 disables these gates (during the time that the processor 14 writes into the RAM 16) and a low level signal to pins #15 of gates 62 and 64 enables them; a low level signal to pin 9 of the RAM 16 causes data to be read therefrom. Pins #15 of gates 62 and 64 and pin #9 of the RAM 16 are connected (via conductor 167) to the Q output of a monostable multivibrator or one-shot 66 (FIG. 9B) to be described hereinafter. Accordingly, a high level at the Q output of the one-shot 66 (transmitted via conductor 167) disables the gates 62 and 64 and enables the RAM 16 to be written into by the processor 14; at this same time, the $\overline{Q}$ output of the multivibrator 66 is at a low level, and this low level is fed over the conductor 68 to pins #1 of the isolator sections 40-1 and 40-2 to enable them to permit the processor 14 to write into the RAM 16.

Figure 9A:
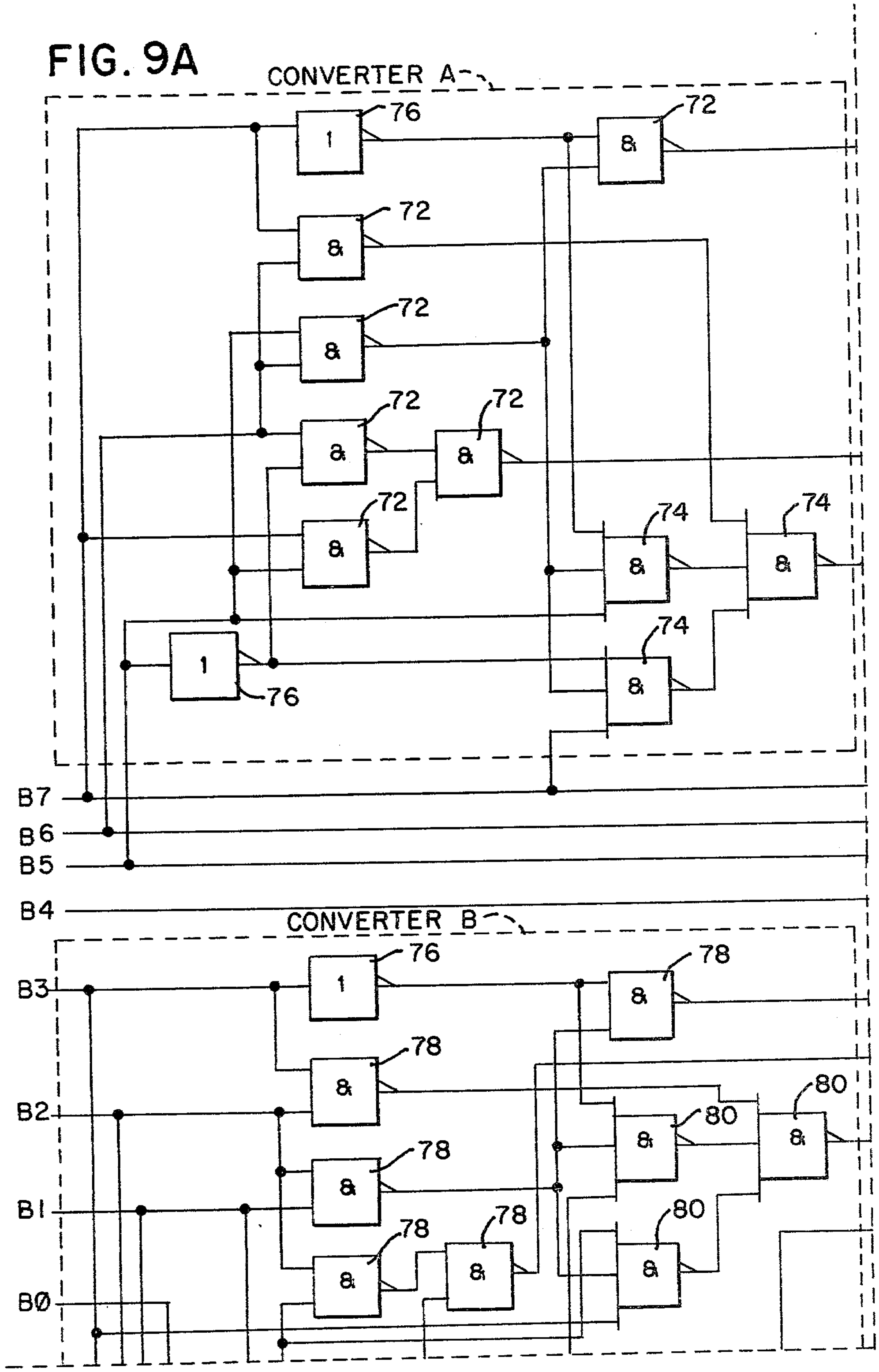
Figure 9B:
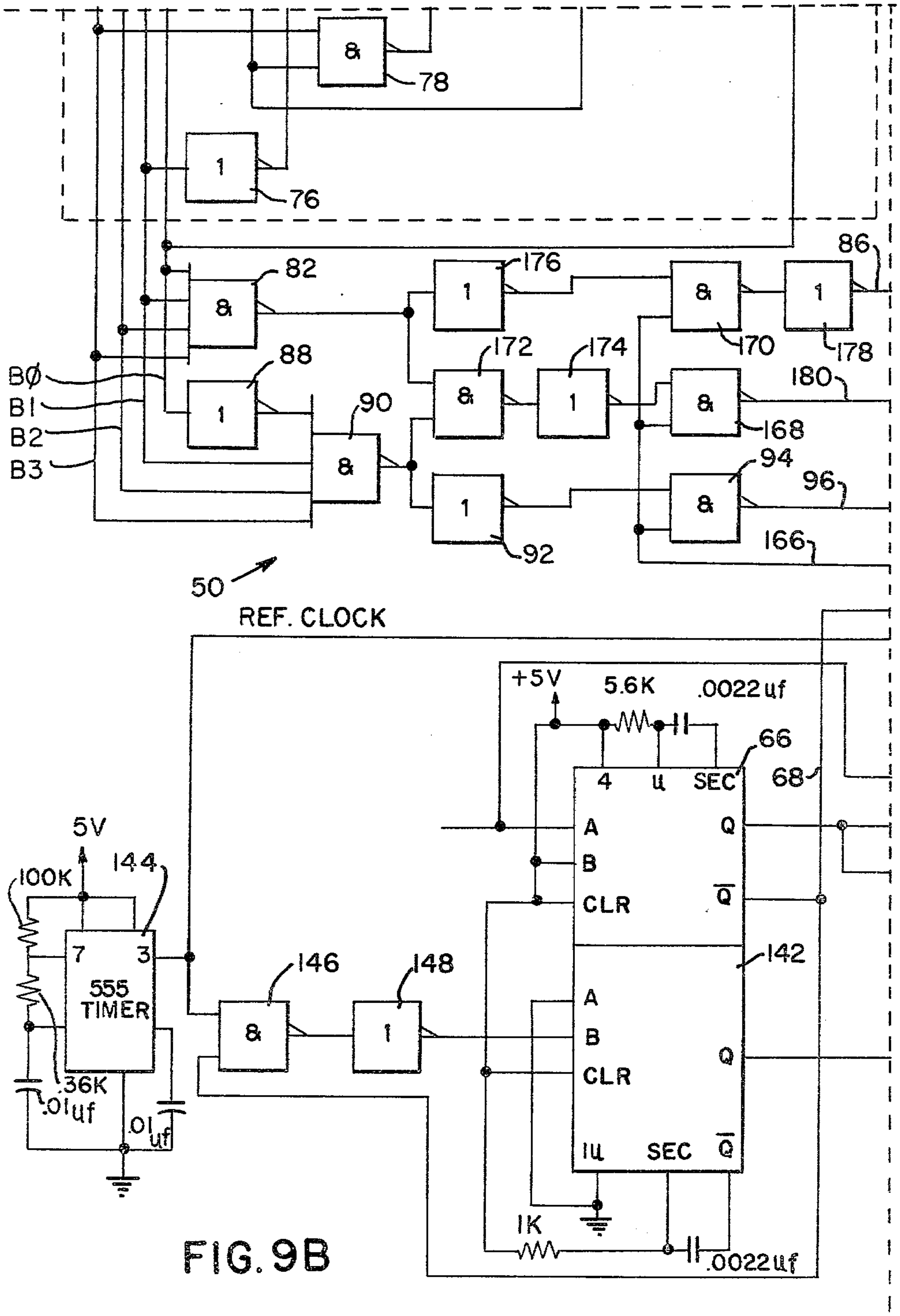
Figure 9C:
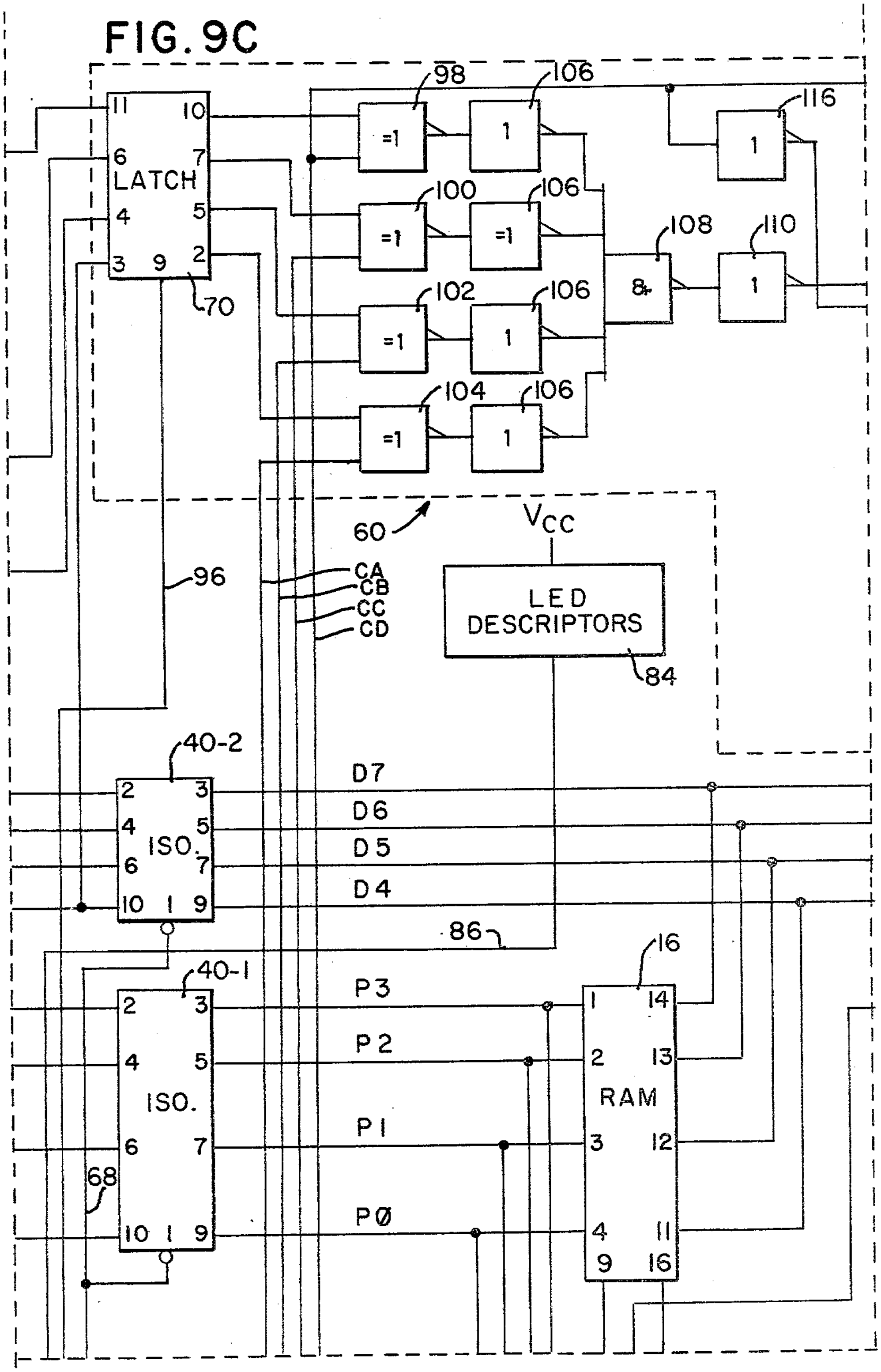

The code converters A and B alluded to earlier herein are shown in more detail in FIGS. 9A and 9B. The function of each of these converters A and B is to permit a binary count from zero to 5 (i.e. 0000 through 0101) to pass therethrough unchanged, but to change the binary counts from 6 through eleven by adding a factor of two to each of these counts. In other words, a binary count of 6 (for location) on the lines Bϕ through B3, is changed to a binary count of eight (for the BCD address as already discussed in relation to FIG. 7) as the data for positioning the characters within the display 12 comes in over these lines. The converter A is not needed for the usual character data coming over the input lines B4 through B7 as this information is decoded by the converters 42 and 44 (FIG. 9E). Digressing for a moment, in the circuit 10 an assigned code which is presented to the data lines Bϕ through B3 is used to initiate the updating of the decimal point within the display 12 via the decimal point circuit 60 shown in FIGS. 1A, 9C, and 9E. While the assigned code is presented to the data lines Bϕ through B3, the data for the location of the decimal point within the display 12 is presented to the data lines B4–B7. Consequently, the converter A (FIG. 9A) is used to convert the location or position data for the decimal point to the corresponding BCD address (as per FIG. 7) which is then transferred to a latch 70 (FIG. 9C) included in the circuit 60. Because the counter 38 is continually incremented, its output soon reaches the value of the BCD address stored in the latch 70, and when it does, this fact is detected by Exclusive OR logic 61 (FIG. 1A) and used by decode logic 63 in the circuit 60 to refresh the decimal point within the display 12 by a technique to be later described herein.

The coverter A (FIG. 9A) is comprised entirely of a plurality of two-input NAND gates 72, a plurality of three-input NAND gates 74, and the inverters 76 which are interconnected as shown in FIG. 9A. The converter B is comprised of inverters 76, several two-input NAND gates 78, and three, three-input NAND gates 80 which are interconnected as shown in FIGS. 9A and 9B; converters A and B are identical.

Figure 9D:
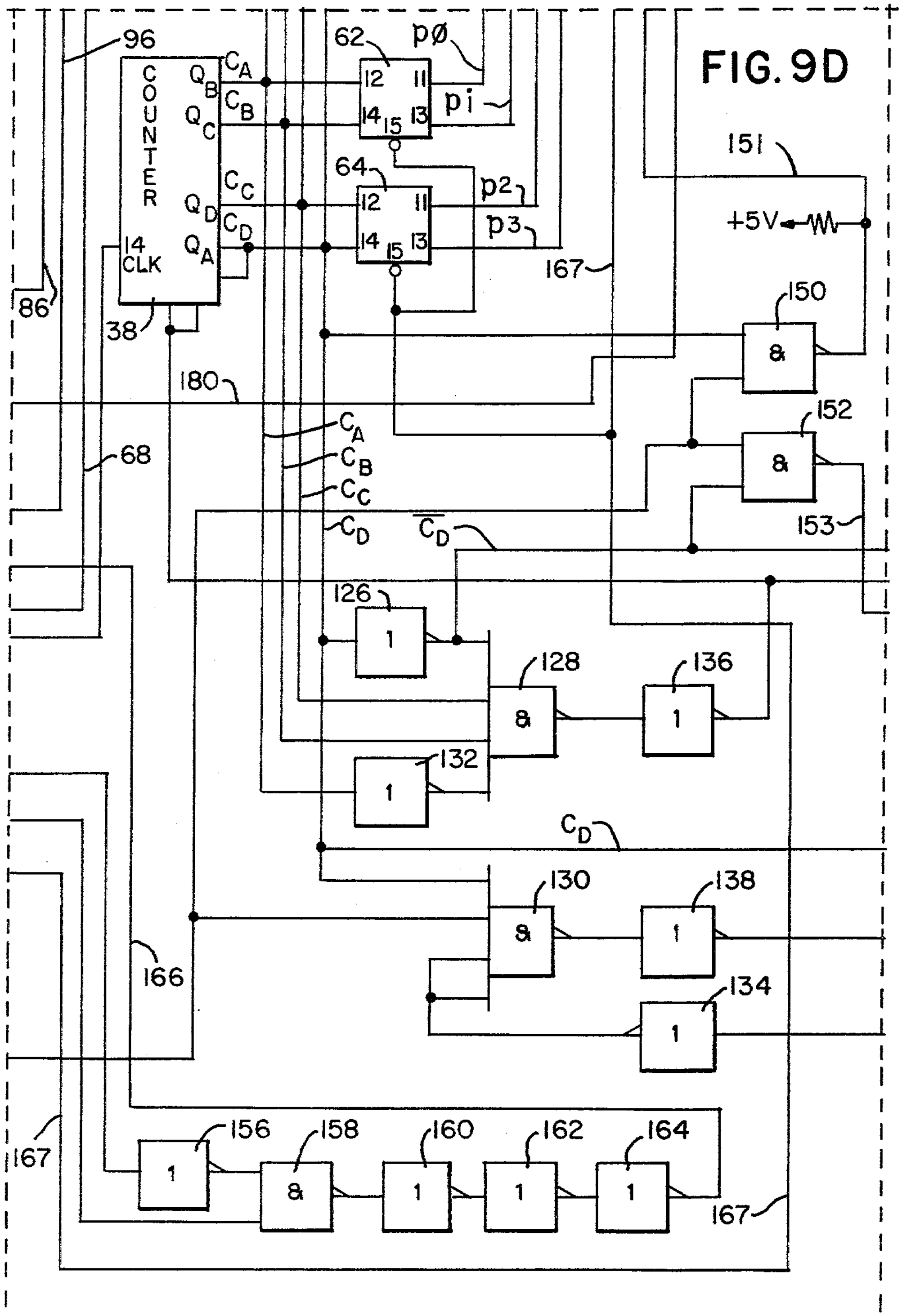
Figure 9F:
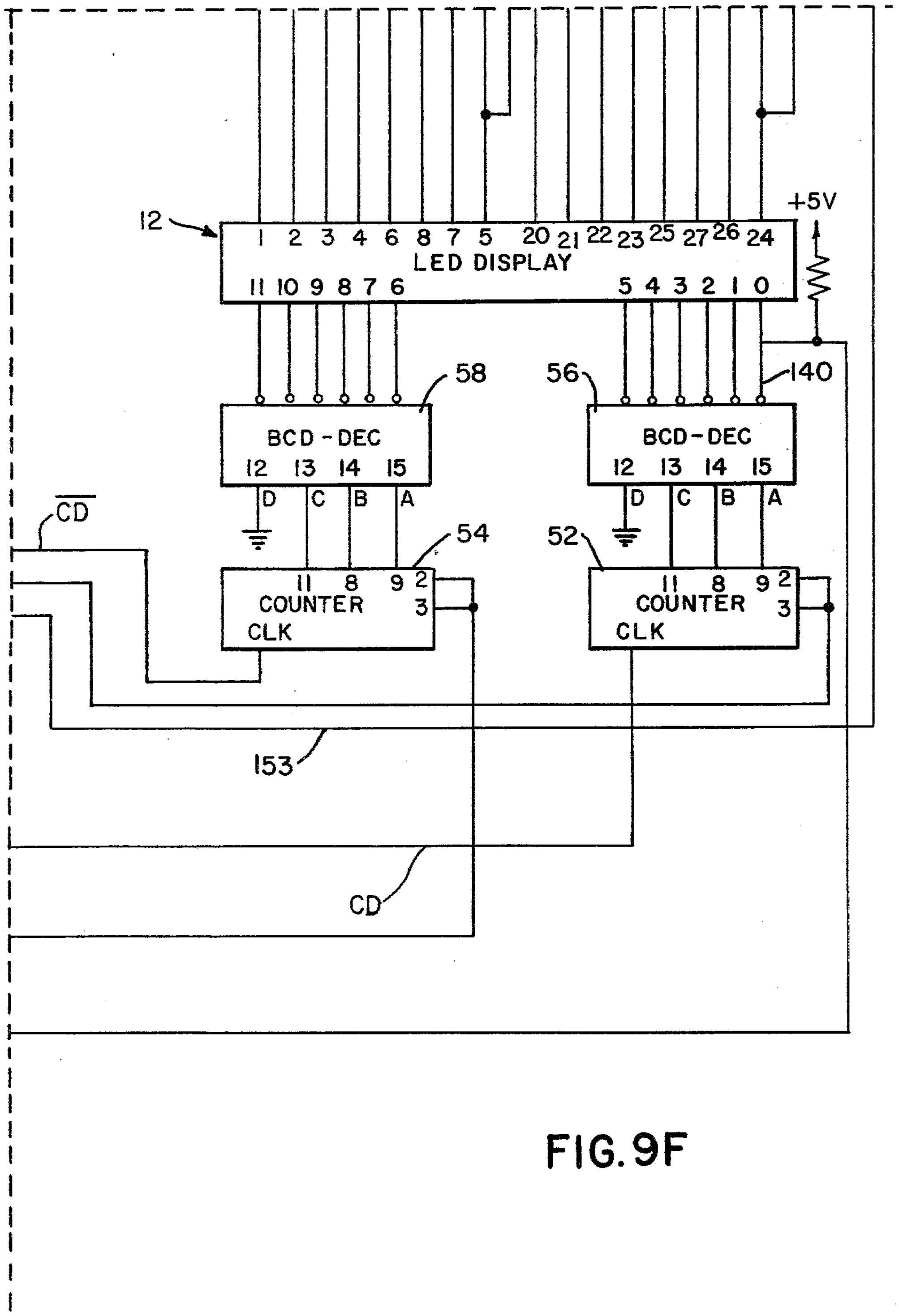

The control logic and reset circuit 50 shown in FIG. 1A is shown in more detail in FIGS. 9B and 9D. The circuit 50 includes a four-input NAND gate 82 (functioning as a decode 15) which is used by the scan circuit 10 to decode a special input (a binary 1111 combination) on the B$\phi$ through B3 lines. This binary 1111 combination lets the circuit 10 know that it is time to update certain LED descriptors 84 shown in FIG. 9C. The binary 1111 combination, when decoded by the NAND gate 82, produces, via some additional circuitry (to be later described), a necessary output signal on conductor 86 to cause the descriptors 84 to be updated or changed. These descriptors 84 do not need to be refreshed by the circuitry 10 but are of the type which remain "on" or energized to provide for "lead through" instructions, for example; they are also used to provide an indication of a negative balance. The selection of the descriptors 84 to be displayed is effected by circuitry not shown nor important to this invention.

The assigned code alluded to earlier herein which was provided on the B$\phi$ through B3 lines to cause the circuit 10 to refresh the decimal point in the display 12 is a BCD count of 14 (i.e. 1110). An inverter 88 (FIG. 9B) is connected between the B$\phi$ input line and one input to the four-input, NAND gate 90, and the remaining three inputs to the gate 90 are connected to the B1 through B3 lines. When a BCD count of 14 is present on the B$\phi$ through B3 lines, the ensuing low level output from the gate 90 is inverted by the inverter 92 and fed into the NAND gate 94 which is used to generate a control signal on conductor 96, which signal is used to strobe or latch the position data of the decimal point into the latch 70 (FIG. 9C) as previously described. For example, if the decimal point is to be located in location #6 (FIG. 7), the converter A would convert the binary data for a "6" into a BCD address of an "8", and the value of 8 would be latched into the latch 70 as just explained. From this time on, every time the counter 38, in being incremented, arrives at a BCD count of 8 (as discussed in relation to FIG. 8), the decimal point circuit 60 will update or refresh the decimal point. In other words, as the counter 38 is incremented, the $C_A$, $C_B$, $C_C$ and $C_D$ outputs therefrom are also fed into Exclusive Or Logic 61 including the Exclusive Or gates 98, 100, 102 and 104 (FIG. 9C) to compare these outputs with the corresponding outputs of the latch 70; when these outputs are equal, refreshing of the decimal point in the display 12 is initiated. The outputs of the gates 98, 100, 102, and 104 are inverted by inverters 106 and are fed into a four-input, NAND gate 108 which is used as a decoding gate and is part of the decode logic 63 (FIG. 1A). The output of the NAND gate 108 is inverted via inverter 110, and the output therefrom is fed into two NAND gates 112 and 114 shown in FIG. 9E. The $C_D$ output from the counter 38 is fed directly into one input of the NAND gate 114, and this $C_D$ output also passes through an inverter 116 and is fed into one input of the NAND gate 112. The NAND gates 112 and 114 are used essentially to ascertain whether the decimal point to be refreshed is in the high bank 36 or the low bank 34 of the display (FIG. 7). From an inspection of the $C_D$ counter output diagram shown in FIG. 8, one can see that when the $C_D$ output of the counter 38 is at a low level, the count therein relates to the low bank 34 (FIG. 7), and when the $C_D$ output is at a high level, the count therein relates to the high bank 36. Accordingly, the NAND gate 112 (FIG. 9E) will produce a low-level output when the $C_D$ line is at a low level and the count on the counter 38 equals the count stored in the latch 70, thereby indicating that the decimal point to be refreshed is located in the low bank 34 of the display 12. Similarly, the NAND gate 114 will produce a low-level output when the $C_D$ line is at a high level and the count on the counter 38 equals the count stored in the latch 70, thereby indicating that the decimal point to be refreshed is located in the high bank 36 of the display 12.

The low level output from the NAND gate 112 (FIG. 9E) is inverted by the inverter 118 whose output is connected to the cathode of a diode 120. The anode of the diode 120 is connected to the input pin 24 (decimal point for low bank 34) of display 12. Similarly, the low level output from the NAND gate 114 is inverted by the inverter 122 whose output is connected to the cathode of a diode 124. The anode of the diode 124 is connected to the input pin 5 (decimal point for high bank 36) of the display 12. When the output of the NAND gate 112 is at a low level (indicating the decimal point is in the low bank 34) the diode 120 becomes back biased, permitting current to flow from a +5 volt supply through a resistor 20-A (included in the block of resistors 20) to pin 24 of the LED 12; this action functions as the anode decimal point switch $S_{DP}$ shown in FIG. 3. Diodes 124 and 120 are also utilized to protect the inverters 122 and 118, respectively, from being subjected to an excessive current flow when the outputs of the NAND gates 114 and 112 are in low level state. When the output of the NAND gate 112 is high (indicating that the decimal point is not located in the low bank 34 but is located in the high bank 36), the diode 120 becomes forward biased, causing the pin 24 of the display 12 to fall substantially below the LED's forward "on" voltage drop, causing current to flow through the diode 120 and thereby preventing the displaying of a decimal point in the low bank 34 of the display 12. The output of the NAND gate 114 (for the high bank 36) is utilized in the same manner as just described in relation to gate 112.

In order to ascertain the particular location of a decimal point within the low bank 34 or the high bank 36 of the display 12, the counters 52 and 54 (FIG. 9F) are used. It should be recalled that the counters 52 and 54 and the BCD-DEC converters 56 and 58 together perform the function of the grounding switches like $S_{11}$, $S_{10}$ shown in FIG. 3. The $C_D$ output from the counter 38 (FIG. 9D) is fed (via conductor $C_D$) into the CLK input of the counter 52 to increment it, and the $C_D$ output from counter 38 is inverted by the inverter 126 and is fed (via conductor $\overline{CD}$) into the CLK input of counter 54 to increment it. In other words, the counters 52 and 54 are alternately pulsed or incremented by the $C_D$ output from the counter 38. The counters 52 and 54 are conventional IC chips such as #7493 A which are manufactured by Texas Instruments, and the BCD-DEC converters 56 and 58 are conventional IC chips such as #SN74145 which are also manufactured by the named company. Because the counters 52 and 54 are clocked from the $C_D$ output of counter 38, (which is the $2^0$ output), the counters 52 and 54 will each produce a binary count from $\phi$ through 5 on the outputs thereof. Counter 52 is clocked each time the $C_D$ output from counter 38 goes from high to low, and counter 54 is clocked each time the $C_D$ output from counter 38 goes from low to high. These two counters 52 and 54 must be reset in order to optimize the duty cycle.

Figure 11:
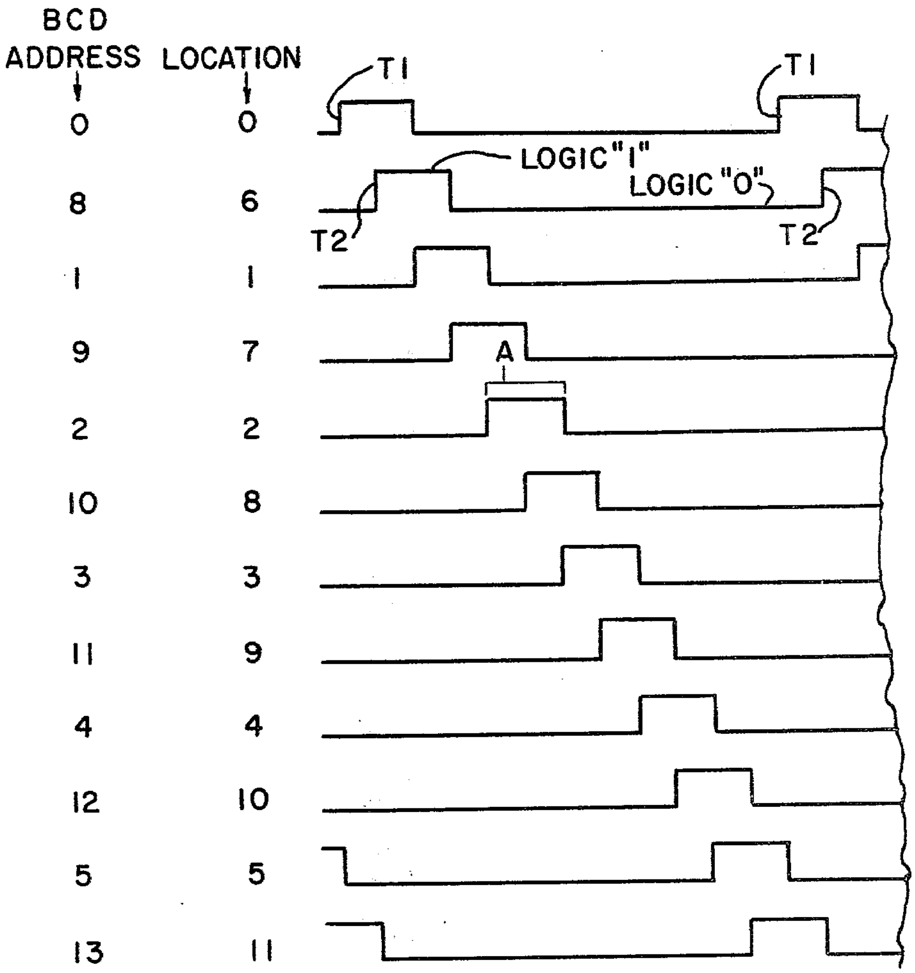
FIG. 11 is a timing diagram associated with the cathode or grounding switches associated with the LED display shown in FIG. 1.

This resetting of counters 52 and 54 (FIG. 9F) is done by decoding the outputs from the counter 38. To effect the decoding, the NAND gates 128 and 130 and the inverters 126, 132, 134, 136 and 138 are used. The $C_B$ and $C_C$ outputs of the counter 38 are fed directly into the NAND gate 128, while the $C_A$ and $C_D$ outputs thereof are inverted by inverters 132 and 126, respectively, prior to being fed into the NAND gate 128. The NAND gate 128 is designed to decode a binary count of 6 (i.e. 0110) from the counter 38 and thereby produce a low level output at gate 128 which is inverted by the inverter 136 and used to reset the counter 52 and the counter 38. This resetting of counter 52 occurs at time T1 as seen in FIGS. 8 and 11. Time T1a shown in FIG. 8 occurs after the propagational delay of counter 38. A BCD count of 6 initiates the resetting of the counters 38 and 52 (refer to FIG. 8). When the counter 52 is reset to zero, the output therefrom is fed into the BCD-DEC converter 56 whose output at conductor 140 goes to a low level. This low level is inverted by the inverter 134 and fed into the NAND gate 130. A positive signal from the Q output of a one-shot 142 (FIG. 9B) is also fed into NAND gate 130 (FIG. 9D) and $C_D$ is fed into NAND gate 130, which conducts, producing a low level input to the inverter 138 which resets counter 54. This reset occurs when the display locations of the high bank 36 go from a location of 11 to a location of 6 as shown by time T2 in FIGS. 8 and 11. After the counter 38 is reset at T1, the refreshing of data in the low bank 34 of the display 12 is repeated. Similarly, at time T2, the refreshing of data in the high bank 36 is repeated. This process is repeated until the processor 14 interrupts the circuit 10 to change the data to be displayed, or the displaying of data is terminated.

As the counter 38 is incremented to produce the BCD outputs shown in FIG. 8, the counters 52, 54 will also be incremented as follows. After the resetting of counter 38, when the CD output thereof is a $\phi$, the output of counter 52 is a $\phi$, and after the first positive level of $C_D$, the counter 58 will be placed in a $\phi$ output (for location 6 in the high bank 36 of the display) and on the next low level of $C_D$, the counter 52 will output a binary "1" etc.

The clock generator 46 shown in FIG. 1 is shown in more detail in FIG. 9B; it includes a conventional timer 144 (such as a 555 timer) which is conventionally wired as a free running oscillator which produces a negative three microsecond pulse every one millisecond. The output of the timer 144 is utilized to advance the counter 38 on a one millisecond basis and also to advance the counters 52 and 54 alternately on a two millisecond basis as shown by the counts in FIG. 11. Assume for the moment that the display 12 is being refreshed, and the processor 14 (FIG. 1A) is not writing into the RAM 16. At this time, the $\overline{Q}$ output of one-shot 66 will be at a high level, and the output of the timer 144, at pin 3 thereof, is the reference clock which is fed into the CLK input of the counter 38. The Q output of the one-shot 66 and the clock output from timer 144 are fed into the NAND gate 146 (FIG. 9B) which produces a low-level output when the two inputs thereto are at a high level. This low-level output is inverted by the inverter 148 and is used to trigger the one-shot 142. The one-shot 142 is conventionally wired to produce a one microsecond positive output on the Q output terminal thereof when triggered by the positive-going portion of the 3 microsecond negative pulse from the timer 144.

The Q output from the timer 142 (FIG. 9B) is fed into one input of NAND gate 150 and is also fed into one input of NAND gate 152 (FIG. 9D), and this Q output is used for latching information in the converters 42 and 44 (FIG. 9E). In this regard, the $C_D$ output from the counter 38 is fed into the remaining input of NAND gate 150 and the $\overline{C_D}$ output from inverter 126 is fed into the remaining input of NAND gate 152. When the $C_D$ output of counter 38 is at a low level, the $\overline{C_D}$ signal from the inverter 126 along with the positive level from the Q output of timer 42 causes the NAND gate 152 to conduct, and the low level output from gate 152 is fed over conductor 153 into pin #5 of converter 42 (FIG. 9E) causing it to latch the information (character to be displayed) on the data lines D4–D7 for displaying in the low bank 34 of the display 12 as previously explained. Similarly, when the $C_D$ output of counter 38 is at a high level, the output of NAND gate 150 is fed over conductor 151 to pin 5 of the converter 44 to latch the data into the converter 44 (FIG. 9E) for displaying in the high bank 36 of the display 12. The one microsecond delay provided by the one-shot 142 permits all the gates to become stabilized prior to latching the data into the converters 42 and 44 (FIG. 9E). It should be recalled that the counter 38 provides the addresses for the RAM 16 for refreshing the display 12.

When the control processor 14 (FIG. 1A) is to write into the RAM 16, a port selection signal is fed over conductor 154 (FIG. 9B) to the A input of the one-shot 66 which causes the Q output to change to a high level. The selection signal is a 3 microsecond negative going pulse which is fed into the A input of the one-shot 66. This high level from the Q output of one-shot 66 disables the gates 62 and 64 (FIG. 9D) to prevent the counter from supplying addresses to the RAM 16, while the $\overline{Q}$ output of the one-shot 66 (now at a low level) enables the isolator sections 40-1 and 40-2 to receive data from the processor 14 as previously described. The low level at the $\overline{Q}$ of one-shot 66 also prevents the gate 146 (FIG. 9B) from triggering the one-shot 142. The negative going interrupt pulse on conductor 154 is fed to an inverter 156 (FIG. 9D) whose output is fed into one input of a NAND gate 158. The remaining input to the gate 158 is connected to the Q output of the one-shot 66. With two high level inputs to the NAND gate 158, the output thereof changes to a low level which is fed into a delay chain of inverters 160, 162, and 164, producing a high level output at inverter 164, which in turn, is fed over conductor 166 to a first input of each of the NAND gates 94, 168 and 170 (FIG. 9B). This delay chain is needed because the output/disable pin 16 of RAM 16 must be sequenced before the write pulse (pin 9 thereof) is activated. It should be recalled that the NAND gates 82 and 88 were designed to decode binary counts of 15 and 14, respectively; consequently, at all other inputs thereto, the outputs therefrom are high levels which cause the output of NAND gate 172 to be at a low level. From gate 172, the low level of output is inverted by the inverter 174 to produce a high level at one input of NAND gate 168. With the port selection signal on conductors 154 and 166 also being at a high level, the NAND gate 168 conducts to produce a low level on the output thereof which is fed over conductor 180 into pin #16 of RAM 16 (FIG. 9C) to provide the "write" signal to have the data on lines D4–D7 written into the RAM 16 at the address location indicated on lines Pϕ–P3 as previously described. When the processor's writing is completed, the signal on conductor 166 falls to a low level, causing the output of gate 168 to return to a high level, which in turn, places the RAM 16 into a read mode whereby the refreshing of the display 12 is continued. During a processor interrupt, when an assigned code of 15 (binary 1111) is on the lines Bϕ–B3, the low level output from gate 82 is inverted by the inverter 176 to condition the NAND gate 170 to conduct, thereby providing the energizing signal over inverter 178 and conductor 86 to energize the LED descriptors 84 (FIG. 9C) as previously explained. A similar arrangement via NAND gate 90 (which decodes a code of a binary 14, i.e. 1110), inverter 92 and NAND gate 94 provides the latching output on conductor 96 for the latch 70 (FIG. 9C) associated with the decimal point circuit 60 previously described.

With regard to FIG. 11, time T1 refers to the resetting of counter 52, and time T2 refers to the resetting of counter 54. The logical "1" shown in FIG. 11 refers to the conducting state and the logical "0" refers to the non-conducting state of the associated cathode swiches like $S_{10}$, $S_{11}$ shown in FIG. 3. The various timing diagrams associated with the various locations in the display 12 are shown along with their corresponding BCD addresses. In the embodiment described, the "on" period as shown by A in FIG. 11 is two milliseconds. It should be noted also that at any one time, there are two cathode swiches (like $S_0$ and $S_{11}$, for example) which are conducting at any one time.

While this invention has been described with regard to an eight bit word system including an eight bit counter like counter 38, it is apparent that the principles thereof can be extended to systems employing a larger or smaller bit word.

What is claimed is:

1. A circuit for controlling the updating of a display in which selected characters are displayed at selected positions therein, comprising:

a memory unit having a plurality of addresses thereto;

means for writing character data in said memory unit at said addresses, which said addresses correspond to predetermined positions in said display;

said memory unit also having a plurality of outputs which are operatively coupled to said display to enable said display to generate characters corresponding to said character data at selected positions in said display when said addresses are selected;

counter means for selecting said addresses for said characters to be displayed and also for selecting said positions at which said characters are displayed; and control means to enable either said writing means of said counter means to address said memory unit.

2. The circuit as claimed in claim 1 further comprising:

means for storing position data with regard to a decimal point to be displayed at a particular position in said display; and decoding means operatively coupled to said storing means and to an output of said counter means to enable the displaying of said decimal point at said particular position when said output of said counter means equals said position data in said storing means.

3. The circuit as claimed in claim 1 in which said display has a low bank containing some of said positions which are consecutively identified as positions a, b, c, . . . n, and said display also has a high bank containing the remaining number of said positions which are consecutively identified as positions $a_1$ $b_1$ $c_1$ . . . $n_1$; and in which said counter means is effective to select said positions at which said characters are displayed in the order of positions a-$a_1$, b-$b_1$, c-$c_1$ . . . n-$n_1$.

4. The circuit as claimed in claim 1 in which said counter means includes a first binary counter; a second binary counter; a third binary counter; and means for incrementing said first binary counter whereby its outputs become said addresses for selecting said characters to be displayed;

said first counter having a $Q_A(2^0)$ terminal whose output is used for incrementing said second binary counter, and with the inverse of the output from said $Q_A(2^{\circ})$ terminal being used for incrementing said third binary counter, whereby said second and third counters enable said counter means to select said positions at which said characters are displayed.

5. The circuit as claimed in claim 4 in which said display is comprised of a low bank having some of said positions therein and is also comprised of a high bank having the remaining number of said positions therein; said display also having a low bank anode switch means and a high bank anode switch means for forming said characters to be displayed in response to said character data; said display also having a low bank cathode switch means and a high bank cathode switch means associated respectively with the corresponding positions in said low and high banks; said second and third binary counters having their outputs fed, respectively, into said low and high bank cathode switch means for selecting said positions at which said characters are displayed.

6. The circuit as claimed in claim 5 in which said first counter is a binary counter having, normally, $Q_A(2^0)$, $Q_B(2^1)$, $Q_C(2^2)$, and $Q_D(2^3)$ terminals thereon, and said first counter has $C_A(2^0)$, $C_B(2^1)$, $C_C(2^2)$ and $C_D(2^3)$ outputs therefrom, with said $C_A(2^0)$ output coming from said $Q_B(2^1)$ terminal, with said $C_B(2^1)$ output coming from said $Q_C(2^2)$ terminal, with said $C_C(2^2)$ output coming from said $Q_D(2^3)$ terminal, and with said $C_D(2^3)$ output coming from said $Q_A(2^0)$ terminal, whereby the binary coded decimal outputs from said first counter follow a numerical pattern of 0, 8, 1, 9, 2, 10, 3, 11, 4, 12, 5, 13, . . . , which numerical pattern corresponds to said addresses for selecting said characters to be displayed.

7. The circuit as claimed in claim 6 further comprising:

means for storing position data with regard to a decimal point to be displayed at a particular position in said display;

decoding means operatively coupled to said storing means and said counter means to enable the displaying of said decimal point at said particular position when said output of said first counter means equals said position data in said storing means.

8. The circuit as claimed in claim 1 in which said writing means comprises:

character data input lines;

position input lines;

a processor for writing said character data in said memory unit at said addresses;

a first isolator means being operatively coupled between said addresses to said memory unit and said position input lines to enable said processor to address said memory unit and to isolate said processor from said memory unit when said processor is not engaged in said writing;

a second isolator means being operatively coupled between said input/output ports of said memory unit and said character data input lines to enable said processor to write said character data in said memory unit and to isolate said processor from said memory unit when said processor is not engated in said writing; and said control means includes selection gates associated with said first and second isolator means to enable either said processor or said counter means to address said memory unit.

9. The circuit as claimed in claim 8 further comprising:

means for storing position data with regard to a decimal point to be displayed at a particular position in said display;

decoding means operatively coupled to said storing means and said counter means to enable the displaying of said decimal point at said particular position when said output of said counter means equals said position data in said storing means;

a first converter operatively coupled between said position input lines and said first isolator means for converting data appearing on said position input lines as 0, 1, 2, 3, 4, 5, 6, 7, 8, 9, 10, and 11, to 0, 1, 2, 3, 4, 5, 8, 9 10, 11, 12, and 13, respectively, prior to reaching said first isolator means;

a second converter operatively coupled between said character data lines and said storing means for converting data appearing on said character data lines as 0, 1, 2, 3, 4, 5, 6, 7, 8, 9, 10, and 11 to 0, 1, 2, 3, 4, 5, 8, 9, 10, 11, 12, and 13, respectively, prior to reaching said storing means;

said counter means including a binary counter whose binary coded decimal outputs therefrom follow a numerical pattern of 0, 8, 1, 9, 2, 10, 3, 11, 4, 12, 5, 13, . . . , when incremented by a clocking pulse, which said numerical pattern corresponds to said addresses for selecting said characters to be displayed; and said memory unit includes a single RAM.

* * * * *